(12) United States Patent
Wang et al.

(10) Patent No.: US 9,941,917 B2
(45) Date of Patent: Apr. 10, 2018

(54) BASE STATION (71) Applicant: HUAWEI TECHNOLOGIES CO., LTD., Shenzhen, Guangdong (CN)

(72) Inventors: Chenglong Wang, Shenzhen (CN); Fredrik Ohlsson, Kista (SE); Vadim Tsoi, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/982,471

(22) Filed: Dec. 29, 2015

(65) Prior Publication Data
US 2016/0198523 A1 Jul. 7, 2016

(30) Foreign Application Priority Data
Jan. 4, 2015 (CN) .......................... 2015-10003741

(51) Int. Cl.
*H04B 1/38* (2015.01)
*H04W 52/00* (2009.01)

(52) U.S. Cl.
CPC .............. *H04B 1/38* (2013.01); *H04W 52/00* (2013.01)

(58) Field of Classification Search
CPC ....... H04B 1/38; H04W 88/085; H04W 52/00
See application file for complete search history.

(56) References Cited

U.S. PATENT DOCUMENTS

| 8,571,499 | B1* | 10/2013 | Kirkpatrick | H04W 84/00 455/127.4 |
| 2013/0077966 | A1 | 3/2013 | Gelbman et al. | |
| 2015/0234405 | A1* | 8/2015 | Chamberlain | G05F 1/62 455/572 |
| 2015/0373871 | A1 | 12/2015 | Lv et al. | |

FOREIGN PATENT DOCUMENTS

| CN | 101988345 A | 3/2011 |
| CN | 202925977 U | 5/2013 |
| CN | 203261105 U | 10/2013 |
| CN | 103596297 A | 2/2014 |
| EP | 2696650 A2 | 2/2014 |
| JP | H07306992 A | 11/1995 |

OTHER PUBLICATIONS eLTE3.1 DBS3900 LTE FDD Product Description Issue 01 Dated: Jun. 13, 2013.*
Product Description for RBS 6301 Ericsson 221 01-FGC 101 0572 Rev PA2.*

* cited by examiner

Primary Examiner — Nizar Sivji
(74) Attorney, Agent, or Firm — Huawei Technologies Co., Ltd.

(57) ABSTRACT

An embodiment of the present invention discloses a base station, including: a baseband unit, a radio remote unit, a power supply device, a signal transmission device, and a backup power supply device. The baseband unit and the radio remote unit are mounted on an antenna tower or a pole. At least one of the power supply device, the signal transmission device, or the backup power supply device is also mounted on the antenna tower or the pole.

25 Claims, 7 Drawing Sheets

BASE STATION

CROSS-REFERENCE TO RELATED APPLICATIONS

This application claims priority to Chinese Patent Application No. 201510003741.X, filed on Jan. 4, 2015, which is hereby incorporated by reference in its entirety.

TECHNICAL FIELD

The present invention relates to the field of electronic communications, and in particular, to a base station.

BACKGROUND

Figure 1:
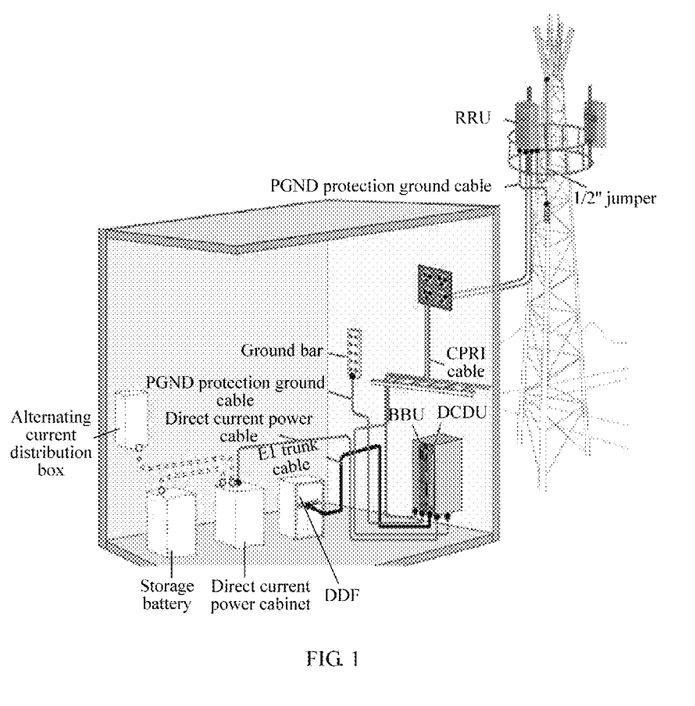
FIG. 1 is a schematic diagram of a conventional base station.
Figure 2:
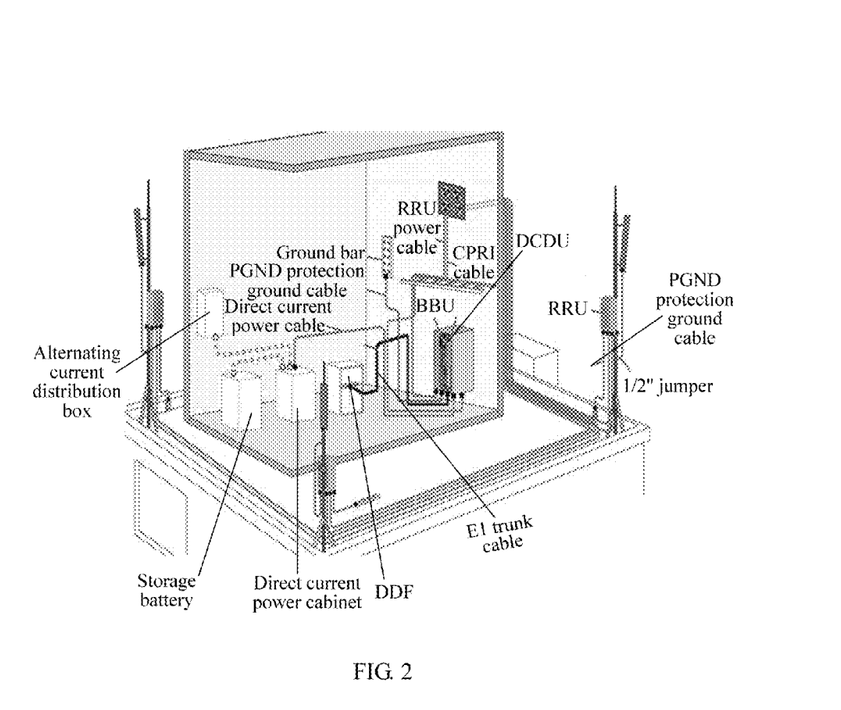
FIG. 2 is a schematic diagram of another conventional base station.

A base station site usually includes main devices and support devices of a base station. The main devices generally include an antenna, a radio remote unit (which may be Radio Remote Unit in English, RRU for short) and a baseband unit (which may be Baseband Unit in English, BBU for short), and the support devices generally include a power source, a storage battery, and a signal transmission device (which may be Transmission Unit in English, TM for short). As shown in FIG. 1 and FIG. 2, the RRU is generally mounted on an antenna tower or a pole, so as to be close to the antenna. The BBU and the support devices are generally installed in an equipment room or a cabinet at the foot of the antenna tower (shown in FIG. 1) or on a roof (shown in FIG. 2). However, devices installed in the equipment room or the cabinet at the foot of the antenna tower or on the roof occupy relatively large space in the equipment room or the cabinet, and the equipment room or the cabinet at the foot of the antenna tower or on the roof needs to be set to have a relatively large volume. Therefore, it is difficult to install a base station in a case in which a relatively large equipment room or cabinet cannot be installed due to small space that can be used to install the equipment room or the cabinet on ground or a roof.

SUMMARY

In view of this, embodiments of the present invention provide a base station and a base station system, to make base station installation easier.

According to a first aspect, a base station provided by an embodiment of the present invention includes: a baseband unit, a radio remote unit, a power supply device, a signal transmission device, and a backup power supply device, where:

the power supply device is configured to convert an input alternating current into a direct current and output the direct current to the baseband unit, the radio remote unit, the signal transmission device, and the backup power supply device;

the backup power supply device is configured to output a direct current to the baseband unit, the radio remote unit, and the signal transmission device in a case in which the alternating current is off; and the signal transmission device is configured to convert a signal output by the baseband unit into a long-distance transmission signal and output the long-distance transmission signal, where:

the baseband unit and the radio remote unit are mounted on an antenna tower or a pole; and at least one of the power supply device, the signal transmission device, and the backup power supply device is also mounted on the antenna tower or the pole.

In a first possible implementation manner of the first aspect, the power supply device is mounted on the antenna tower or the pole, and the signal transmission device and the backup power supply device are installed in an equipment room or a cabinet at the foot of the antenna tower or on a roof.

In a second possible implementation manner of the first aspect, the power supply device and the signal transmission device are mounted on the antenna tower or the pole, and the backup power supply device is installed in an equipment room or a cabinet at the foot of the antenna tower or on a roof.

With reference to the first aspect or any possible implementation manner of the first to the second possible implementation manners of the first aspect, in a third possible implementation manner, at least one device, mounted on the antenna tower or the pole, of the power supply device, the signal transmission device, and the backup power supply device, the baseband unit, and the radio remote unit are referred to as tower-mounted devices; the tower-mounted devices mounted on the antenna tower or the pole are arranged in one or more rows in a height direction of the antenna tower or the pole; and each row has one or more of the tower-mounted devices.

With reference to the first aspect or any possible implementation manner of the first to the third possible implementation manners of the first aspect, in a fourth possible implementation manner, among the tower-mounted devices mounted on the antenna tower or the pole, the tower-mounted devices located in a same row are aligned in the height direction of the antenna tower or the pole.

With reference to the first aspect or any possible implementation manner of the first to the fourth possible implementation manners of the first aspect, in a fifth possible implementation manner, among the tower-mounted devices mounted on the antenna tower or the pole, the tower-mounted devices located in a same row are the same or similar in height.

With reference to the first aspect or any possible implementation manner of the first to the fifth possible implementation manners of the first aspect, in a sixth possible implementation manner, among the tower-mounted devices mounted on the antenna tower or the pole, the tower-mounted devices located in a same row are the same or similar in cross-sectional shape and size.

With reference to the first aspect or any possible implementation manner of the first to the sixth possible implementation manners of the first aspect, in a seventh possible implementation manner, among the tower-mounted devices mounted on the antenna tower or the pole, the tower-mounted devices located in a same row are different in thickness.

With reference to the first aspect or any possible implementation manner of the first to the seventh possible implementation manners of the first aspect, in an eighth possible implementation manner, among the tower-mounted devices mounted on the antenna tower or the pole, a spacing between adjacent tower-mounted devices among the tower-mounted devices located in a same row is zero.

With reference to the first aspect or any possible implementation manner of the first to the eighth possible implementation manners of the first aspect, in a ninth possible implementation manner, among the tower-mounted devices mounted on the antenna tower or the pole, all the tower-mounted devices located in a same row have a rectangular cross-sectional shape.

With reference to the first aspect or any possible implementation manner of the first to the ninth possible implementation manners of the first aspect, in a tenth possible implementation manner, a side surface of the tower-mounted device by which the tower-mounted device is mounted on the antenna tower or the pole is a mounting side surface; a side surface, opposite to the mounting side surface, of the tower-mounted device is provided with a cable outlet; and an electrical signal transmission line of the tower-mounted device extends from the inside of the tower-mounted device to the outside of the tower-mounted device through the cable outlet.

With reference to the first aspect or any possible implementation manner of the first to the tenth possible implementation manners of the first aspect, in an eleventh possible implementation manner, the side surface of the tower-mounted device by which the tower-mounted device is mounted on the antenna tower or the pole is the mounting side surface; the mounting side surface is a back surface of the tower-mounted device; and the side surface, opposite to the mounting side surface, of the tower-mounted device is a front panel of the tower-mounted device.

According to a second aspect, a base station system provided by an embodiment of the present invention includes: an antenna and a base station, where the base station includes a baseband unit, a radio remote unit, a power supply device, a signal transmission device, and a backup power supply device, where:

the power supply device is configured to convert an input alternating current into a direct current and output the direct current to the baseband unit, the radio remote unit, the signal transmission device, and the backup power supply device;

the backup power supply device is configured to output a direct current to the baseband unit, the radio remote unit, and the signal transmission device in a case in which the alternating current is off; and the signal transmission device is configured to convert a signal output by the baseband unit into a long-distance transmission signal and output the long-distance transmission signal, where:

the baseband unit and the radio remote unit are mounted on an antenna tower or a pole; and at least one of the power supply device, the signal transmission device, and the backup power supply device is also mounted on the antenna tower or the pole; and the antenna is mounted at the top of the antenna tower or the pole, or the antenna is integrated with the RRU.

In a first possible implementation manner of the second aspect, the power supply device is mounted on the antenna tower or the pole, and the signal transmission device and the backup power supply device are installed in an equipment room or a cabinet at the foot of the antenna tower or on a roof.

In a second possible implementation manner of the second aspect, the power supply device and the signal transmission device are mounted on the antenna tower or the pole, and the backup power supply device is installed in an equipment room or a cabinet at the foot of the antenna tower or on a roof.

With reference to the second aspect or any possible implementation manner of the first to the second possible implementation manners of the second aspect, in a third possible implementation manner, at least one device, mounted on the antenna tower or the pole, of the power supply device, the signal transmission device, and the backup power supply device, the baseband unit, and the radio remote unit are referred to as tower-mounted devices; the tower-mounted devices mounted on the antenna tower or the pole are arranged in one or more rows in a height direction of the antenna tower or the pole; and each row has one or more of the tower-mounted devices.

With reference to the second aspect or any possible implementation manner of the first to the third possible implementation manners of the second aspect, in a fourth possible implementation manner, among the tower-mounted devices mounted on the antenna tower or the pole, the tower-mounted devices located in a same row are aligned in the height direction of the antenna tower or the pole.

With reference to the second aspect or any possible implementation manner of the first to the fourth possible implementation manners of the second aspect, in a fifth possible implementation manner, among the tower-mounted devices mounted on the antenna tower or the pole, the tower-mounted devices located in a same row are the same or similar in height.

With reference to the second aspect or any possible implementation manner of the first to the fifth possible implementation manners of the second aspect, in a sixth possible implementation manner, among the tower-mounted devices mounted on the antenna tower or the pole, the tower-mounted devices located in a same row are the same or similar in cross-sectional shape and size.

With reference to the second aspect or any possible implementation manner of the first to the sixth possible implementation manners of the second aspect, in a seventh possible implementation manner, among the tower-mounted devices mounted on the antenna tower or the pole, the tower-mounted devices located in a same row are different in thickness.

With reference to the second aspect or any possible implementation manner of the first to the seventh possible implementation manners of the second aspect, in an eighth possible implementation manner, among the tower-mounted devices mounted on the antenna tower or the pole, a spacing between adjacent tower-mounted devices among the tower-mounted devices located in a same row is zero.

With reference to the second aspect or any possible implementation manner of the first to the eighth possible implementation manners of the second aspect, in a ninth possible implementation manner, among the tower-mounted devices mounted on the antenna tower or the pole, all the tower-mounted devices located in a same row have a rectangular cross-sectional shape.

With reference to the second aspect or any possible implementation manner of the first to the ninth possible implementation manners of the second aspect, in a tenth possible implementation manner, a side surface of the tower-mounted device by which the tower-mounted device is mounted on the antenna tower or the pole is a mounting side surface; a side surface, opposite to the mounting side surface, of the tower-mounted device is provided with a cable outlet; and an electrical signal transmission line of the tower-mounted device extends from the inside of the tower-mounted device to the outside of the tower-mounted device through the cable outlet.

With reference to the second aspect or any possible implementation manner of the first to the tenth possible implementation manners of the second aspect, in an eleventh possible implementation manner, the side surface of the tower-mounted device by which the tower-mounted device is mounted on the antenna tower or the pole is the mounting side surface; the mounting side surface is a back surface of the tower-mounted device; and the side surface, opposite to the mounting side surface, of the tower-mounted device is a front panel of the tower-mounted device.

With reference to the second aspect or any possible implementation manner of the first to the eleventh possible implementation manners of the second aspect, in a twelfth possible implementation manner, the base station system further includes the antenna tower or the pole.

According to the foregoing solutions, at least one of the power supply device, the signal transmission device, and the backup power supply device is also mounted on the antenna tower or the pole, and does not need to be installed in the equipment room or the cabinet at the foot of the antenna tower or on the roof. Therefore, the equipment room or the cabinet at the foot of the antenna tower or on the roof does not need to be set to have a relatively large volume. In a case in which the equipment room or the cabinet at the foot of the antenna tower or on the roof becomes smaller in volume, relatively large installation space is not required on ground, thereby making base station installation easy.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 3:
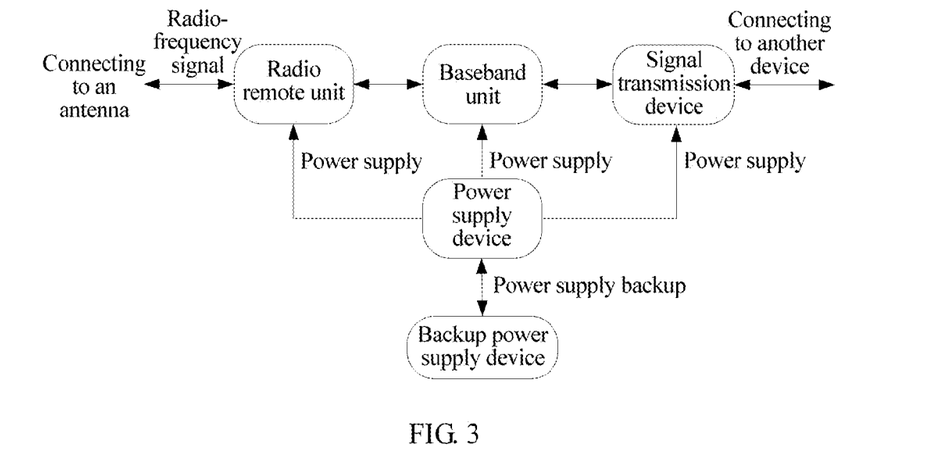
FIG. 3 is a schematic principle diagram of a base station according to an embodiment of the present invention.

As shown in FIG. 3, the present invention provides an embodiment of a base station, including: a baseband unit, a radio remote unit, a power supply device, a signal transmission device, and a backup power supply device.

The power supply device is configured to convert an input alternating current into a direct current and output the direct current to the baseband unit, the radio remote unit, the signal transmission device, and the backup power supply device.

The backup power supply device is configured to output a direct current to the baseband unit, the radio remote unit, and the signal transmission device when the alternating current is off.

The signal transmission device is configured to convert a signal output by the baseband unit into a long-distance transmission signal and output the long-distance transmission signal.

The baseband unit and the radio remote unit are mounted on an antenna tower or a pole; and at least one of the power supply device, the signal transmission device, and the backup power supply device is also mounted on the antenna tower or the pole.

In the foregoing embodiment of the present invention, at least one of the power supply device, the signal transmission device, and the backup power supply device is also mounted on the antenna tower or the pole, and does not need to be installed in an equipment room or a cabinet at the foot of the antenna tower or on a roof. Therefore, the equipment room or the cabinet at the foot of the antenna tower or on the roof does not need to be set to have a relatively large volume. In a case in which the equipment room or the cabinet at the foot of the antenna tower or on the roof becomes smaller in volume, relatively large installation space is not required on ground, thereby making base station installation easy. Moreover, from another perspective, installation space on the ground is also reduced.

Further, if all the power supply device, the signal transmission device, and the backup power supply device are mounted on the antenna tower or the pole, the equipment room or the cabinet at the foot of the antenna tower or on the roof does not need to be provided; therefore, no space on the ground needs to be occupied to install the equipment room or the cabinet at the foot of the antenna tower or on the roof, which avoids the need for the installation space on the ground and leads to a more integrated base station.

Further, if all the power supply device, the signal transmission device, and the backup power supply device are mounted on the antenna tower or the pole, the equipment room or the cabinet at the foot of the antenna tower or on the roof does not need to be provided. Therefore, no large lifting device is required to carry the equipment room or the cabinet, thereby making a base station installation process easy and reducing noise caused in the installation process and impact on life of surrounding residents.

Further, at least one of the power supply device, the signal transmission device, and the backup power supply device is mounted on the antenna tower or the pole, and if an installation position is relatively high (for example, higher than 30 meters), a risk of being stolen may also be reduced.

Figure 4:
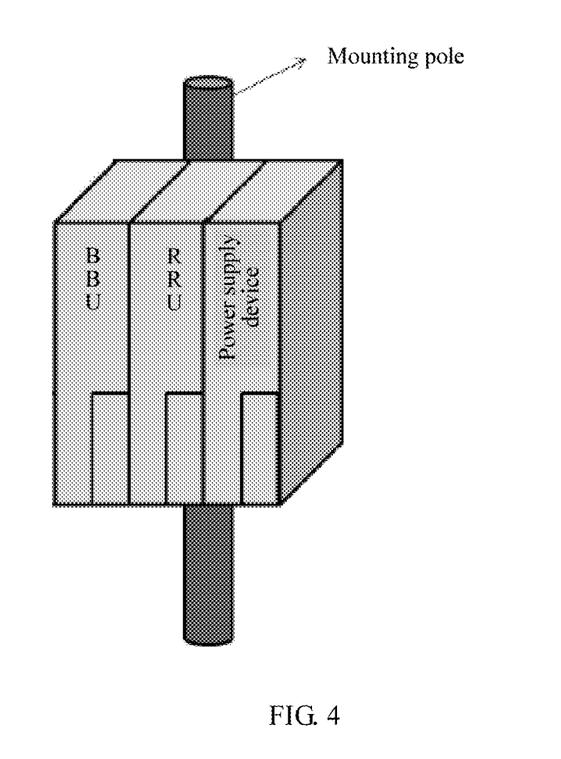
FIG. 4 is a schematic structural diagram of a base station according to an embodiment of the present invention.

As shown in FIG. 4, in an embodiment of the foregoing base station, as an alternative, the power supply device is mounted on the antenna tower or the pole, and the signal transmission device and the backup power supply device are installed in the equipment room or the cabinet at the foot of the antenna tower or on the roof.

As another alternative, the power supply device and the signal transmission device are mounted on the antenna tower or the pole, and the backup power supply device is installed in the equipment room or the cabinet at the foot of the antenna tower or on the roof.

Figure 5:
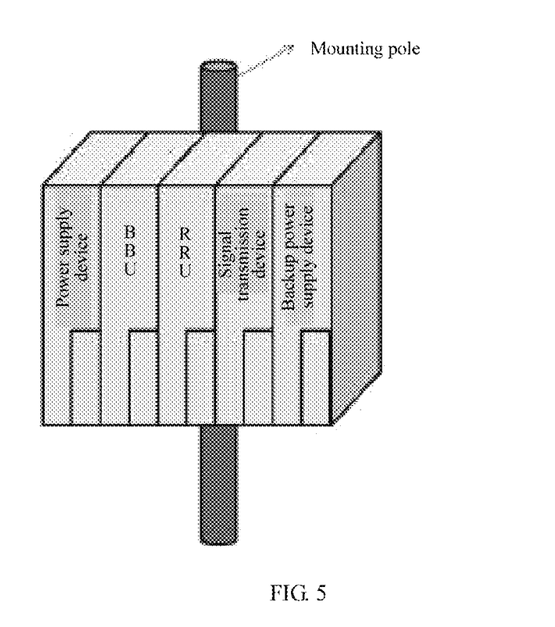
FIG. 5 is a schematic structural diagram of another base station according to an embodiment of the present invention.

As shown in FIG. 5, as another alternative, all the power supply device, the signal transmission device, and the backup power supply device are mounted on the antenna tower or the pole.

Figure 6:
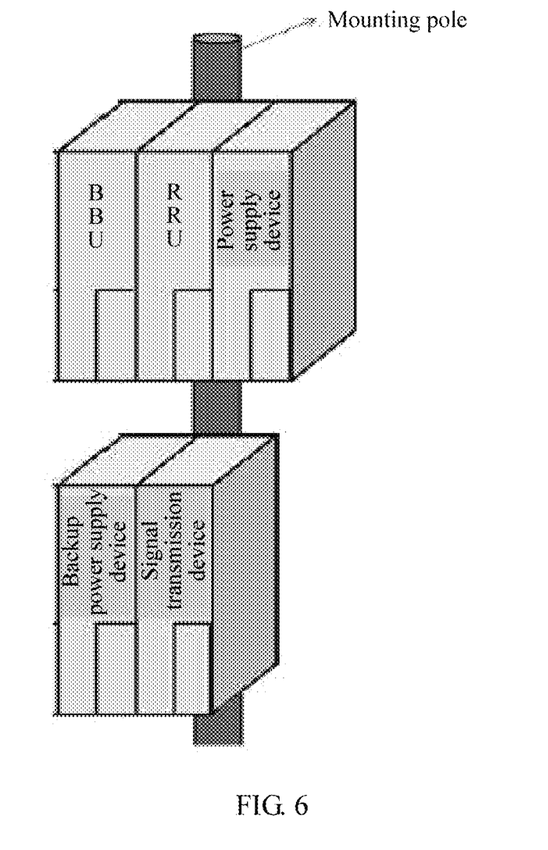
FIG. 6 is a schematic structural diagram of still another base station according to an embodiment of the present invention.

As shown in FIG. 6, in an embodiment of the foregoing base station, further, tower-mounted devices mounted on the antenna tower or the pole are arranged in one or more rows, and each row has one or more of the tower-mounted devices. At least one device, mounted on the antenna tower or the pole, of the power supply device, the signal transmission device, and the backup power supply device, the baseband unit, and the radio remote unit are referred to as tower-mounted devices.

The tower-mounted devices may be arranged in one or more rows in a height direction of the antenna tower or the pole. If the base station needs to be expanded, a new tower-mounted device may be further added in each row, and arrangement may be made in multiple rows if one row is full. The antenna tower or the pole is relatively high; therefore, the tower-mounted devices may be arranged in multiple rows in the height direction of the antenna tower or the pole, thereby making base station expansion easy.

Further, among the tower-mounted devices mounted on the antenna tower or the pole, the tower-mounted devices located in a same row are aligned in the height direction of the antenna tower or the pole. As one of specific implementation manners, the tower-mounted devices located in a same row may be the same or similar in height.

Further, among the tower-mounted devices mounted on the antenna tower or the pole, the tower-mounted devices located in a same row are the same or similar in cross-sectional shape and size, and are the same or different in thickness. For example, the tower-mounted devices located in a same row are blade-shaped and are mounted side by side. In a case in which the tower-mounted devices located in a same row are the same or similar in cross-sectional shape and size, and are the same or different in thickness, manufacturing manners of housings of the tower-mounted devices located in a same row are the same or similar, thereby making it convenient to together produce the housings of the tower-mounted devices located in a same row, and making it possible to even use a same product assembly line. Moreover, the housings are the same or similar in cross-sectional shape and size, which facilitates automation of assembly and commissioning, and improves production efficiency. The tower-mounted devices located in a same row are the same or similar in cross-sectional shape and size, and therefore have outer packing that may be the same or similar in cross-sectional shape and size, which facilitates storage space reduction and warehousing management during storage and facilitates transportation space reduction during transportation. In addition, the tower-mounted devices located in a same row are the same or similar in cross-sectional shape and size, and therefore, when the tower-mounted devices located in a same row are being mounted on the antenna tower or the pole, a same or similar mounting tool may be used, and even same or similar installation fittings may be used, which makes operations in the installation process easier. If same installation fittings are used, in each row of tower-mounted devices, an order in which the tower-mounted devices are arranged does not need to be fixed, the tower-mounted devices may be arranged in an arbitrary order, and the order may be changed, making the installation process more flexible. Furthermore, during subsequent base station expansion, a new tower-mounted device may be mounted near the existing tower-mounted devices, and in original installation space, a height and a depth remain the same, and only a thickness increases, thereby fully taking advantage of the installation space on the antenna tower or the pole and achieving visual consistency and continuity of the new and old tower-mounted devices.

In an embodiment of the foregoing base station, as an alternative, all the tower-mounted devices may be set to be the same or similar in cross-sectional shape and size, and to be the same or different in thickness. In this way, the advantages described in the foregoing paragraph are more obvious.

In an embodiment of the foregoing base station, as an alternative, among the tower-mounted devices mounted on the antenna tower or the pole, a spacing between adjacent tower-mounted devices among the tower-mounted devices located in a same row is zero. Therefore, the installation space on the antenna tower or the pole may be reduced and fully taken advantage of.

In the foregoing embodiments of the present invention, among the tower-mounted devices mounted on the antenna tower or the pole, the tower-mounted devices located in a same row are the same or similar in cross-sectional shape and size, and are the same or different in thickness; and a spacing between adjacent tower-mounted devices among the tower-mounted devices located in a same row is zero, so that the tower-mounted devices located in a row are mounted side by side and aligned in the height direction and a depth direction. The tower-mounted devices located in a same row are in a box (One Box) shape, which may effectively reduce and fully take advantage of the installation space on the antenna tower or the pole.

In an embodiment of the foregoing base station, as an alternative, among the tower-mounted devices mounted on the antenna tower or the pole, all the tower-mounted devices located in a same row may have a rectangular cross-sectional shape. For example, the tower-mounted devices located in a same row are the same in height and width, and differ only in thickness.

In embodiments of the foregoing base station, as an alternative, a side surface of the tower-mounted device by which the tower-mounted device is mounted on the antenna tower or the pole is a mounting side surface; a side surface, opposite to the mounting side surface, of the tower-mounted device is provided with a cable outlet; and an electrical signal transmission line of the tower-mounted device extends from the inside of the tower-mounted device to the outside of the tower-mounted device through the cable outlet.

As one specific implementation, the mounting side surface may be a back surface of the tower-mounted device; and the side surface, opposite to the mounting side surface, of the tower-mounted device may be a front panel of the tower-mounted device.

The front panel of the tower-mounted device is disposed opposite to the mounting side surface of the tower-mounted device, and the front panel of the tower-mounted device is located at one side away from the antenna tower or the pole. Therefore, it is convenient to maintain the tower-mounted device through the front panel.

Figure 7:
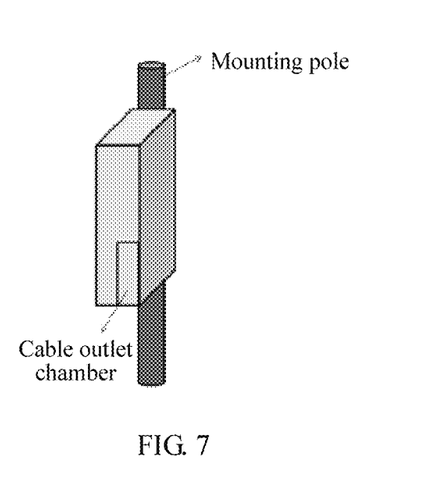
FIG. 7 is a schematic diagram of a cable outlet cavity of a base station according to an embodiment of the present invention.

As shown in FIG. 7, as one specific implementation manner, the front panel of the tower-mounted device is provided with a cable outlet cavity, the cable outlet is disposed on a cover plate of the cable outlet cavity, and the electrical signal transmission line is sealed and waterproofed by the cover plate of the cable outlet cavity by using a waterproof rubber strip.

In embodiments of the foregoing base station, as an alternative, the electrical signal transmission line may be a cable, a power cable, or the like.

In embodiments of the foregoing base station, as an alternative, there may be one, two, or three radio remote units.

Figure 8:
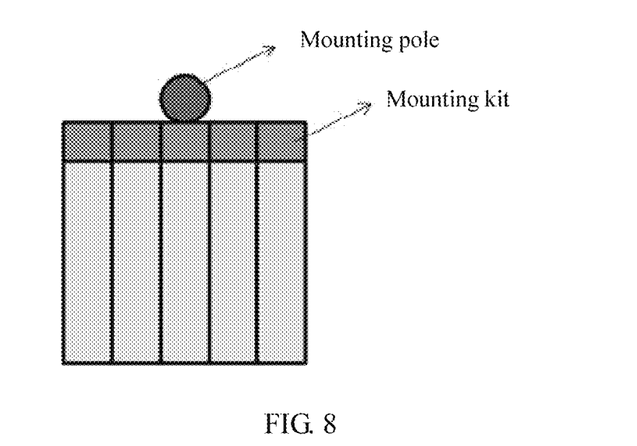
FIG. 8 is a schematic diagram of installation fittings of a base station according to an embodiment of the present invention.

As shown in FIG. 8, in embodiments of the foregoing base station, as an alternative, the base station may further include installation fittings, the mounting side surface of the tower-mounted device is provided with a mounting interface, and the tower-mounted device is mounted on the antenna tower or the pole by using the installation fittings and the mounting interface.

Figure 9:
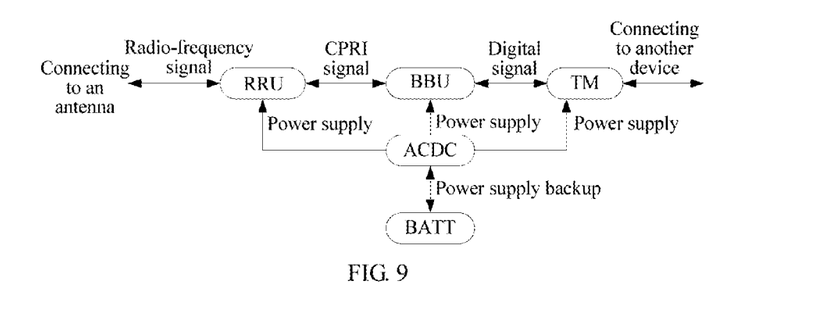
FIG. 9 is a schematic principle diagram of another base station according to an embodiment of the present invention.

As shown in FIG. 9, in embodiments of the foregoing base station, as an alternative, the power supply device may be an AC/DC (Alternating Current/Direct Current, alternating current/direct current) power module.

In embodiments of the foregoing base station, as an alternative, the backup power supply device may be a storage battery (which may be Battery in English, BATT for short).

In embodiments of the foregoing base station, as an alternative, the equipment room may be an in-building equipment room or a simple out-of-building equipment room.

In embodiments of the foregoing base station, as an alternative, the cabinet may be an outdoor cabinet.

In embodiments of the foregoing base station, as an alternative, a long-distance transmission signal output by the signal transmission device is transmitted to a remote core network device.

In embodiments of the foregoing base station, as an alternative, the BBU and the RRU exchange data through a common public radio interface (which may be Common Public Radio Interface in English, CPRI for short).

The present invention further provides an embodiment of a base station system. The base station system includes a base station and an antenna. The antenna is mounted at the top of the antenna tower or the pole, or the antenna is integrated with the RRU, for example, the antenna is integrated into the RRU. A specific implementation manner of the base station may be any one of the embodiments of the foregoing base station.

In the embodiment of the foregoing base station system, as an alternative, the base station system may further include the antenna tower or the pole.

What is claimed is:

1. A base station, comprising:
   a baseband unit;
   a radio remote unit;
   a signal transmission device;
   a backup power supply device; and
   a power supply device coupled to the baseband unit, the radio remote unit, the signal transmission device, and the backup power supply device,
   wherein the power supply device is configured to convert an input alternating current into a first direct current and output the first direct current to the baseband unit, the radio remote unit, the signal transmission device, and the backup power supply device,
   wherein the backup power supply device is configured to output a second direct current to the baseband unit, the radio remote unit, and the signal transmission device when the input alternating current is off,
   wherein the signal transmission device is configured to convert a signal output generated by the baseband unit into a long-distance transmission signal and output the long-distance transmission signal, and
   wherein the baseband unit and the radio remote unit are mounted on an antenna tower or a pole, and at least one of the power supply device, the signal transmission device, or the backup power supply device is also mounted on the antenna tower or the pole, wherein the baseband unit, the radio remote unit and at least one of the power supply device, the signal transmission device, or the backup power supply device are referred to as tower-mounted devices, the tower-mounted devices are blade-shaped and are mounted side by side in one or more rows in a height direction of the antenna tower or the pole, and each row has a plurality of the tower-mounted devices.

2. The base station according to claim 1, wherein the power supply device is mounted on the antenna tower or the pole, and the signal transmission device and the backup power supply device are installed in an equipment room or a cabinet at foot of the antenna tower or on a roof.

3. The base station according to claim 1, wherein the power supply device and the signal transmission device are mounted on the antenna tower or the pole, and the backup power supply device is installed in an equipment room or a cabinet at foot of the antenna tower or on a roof.

4. The base station according to claim 1, wherein, among the tower-mounted devices mounted on the antenna tower or the pole, the tower-mounted devices located in a same row are aligned in the height direction of the antenna tower or the pole.

5. The base station according to claim 1, wherein, among the tower-mounted devices mounted on the antenna tower or the pole, the tower-mounted devices located in a same row are the same or similar in height.

6. The base station according to claim 1, wherein, among the tower-mounted devices mounted on the antenna tower or the pole, the tower-mounted devices located in a same row are the same or similar in cross-sectional shape and size.

7. The base station according to claim 1, wherein, among the tower-mounted devices mounted on the antenna tower or the pole, the tower-mounted devices located in a same row are different in thickness.

8. The base station according to claim 1, wherein, among the tower-mounted devices mounted on the antenna tower or the pole, there is no spacing between adjacent tower-mounted devices among the tower-mounted devices located in a same row.

9. The base station according to claim 1, wherein, among the tower-mounted devices mounted on the antenna tower or the pole, all the tower-mounted devices located in a same row have a rectangular cross-sectional shape.

10. The base station according to claim 1, wherein a side surface of the tower-mounted device by which the tower-mounted device is mounted on the antenna tower or the pole is a mounting side surface; a side surface, opposite to the mounting side surface, of the tower-mounted device is provided with a cable outlet; and an electrical signal transmission line of the tower-mounted device extends from the inside of the tower-mounted device to the outside of the tower-mounted device through the cable outlet.

11. The base station according to claim 1, wherein the side surface of the tower-mounted device by which the tower-mounted device is mounted on the antenna tower or the pole is the mounting side surface; the mounting side surface is a back surface of the tower-mounted device; and the side surface, opposite to the mounting side surface, of the tower-mounted device is a front panel of the tower-mounted device.

12. The base station according to claim 1, wherein, the tower-mounted devices located in a same row are in a box shape.

13. A base station system, comprising:
    an antenna; and
    a base station coupled to the antenna,
    wherein the antenna is mounted at a top of an antenna tower or a pole, or the antenna is integrated with a radio remote unit, wherein the base station comprises a baseband unit, the radio remote unit, a signal transmission device, a backup power supply device, and a power supply device coupled to the baseband unit, the radio remote unit, the signal transmission device, and the backup power supply device, wherein the power supply device is configured to convert an input alternating current into a first direct current and output the first direct current to the baseband unit, the radio remote unit, the signal transmission device, and the backup power supply device, the backup power supply device is configured to output a second direct current to the baseband unit, the radio remote unit, and the signal transmission device when the input alternating current is off, and the signal transmission device is configured to convert a signal output by the baseband unit into a long-distance transmission signal and output the long-distance transmission signal, wherein the baseband unit and the radio remote unit are mounted on the antenna tower or the pole; and at least one of the power supply device, the signal transmission device, or the backup power supply device is also mounted on the antenna tower or the pole, wherein the baseband unit, the radio remote unit and at least one of the power supply device, the signal transmission device, or the backup power supply device are referred to as tower-mounted devices, the tower-mounted devices are blade-shaped and are mounted side by side in one or more rows in a height direction of the antenna tower or the pole, and each row has a plurality of the tower-mounted devices.

14. The base station system according to claim 13, wherein the base station system further comprises the antenna tower or the pole.

15. The base station system according to claim 13, wherein the power supply device is mounted on the antenna tower or the pole, and the signal transmission device and the backup power supply device are installed in an equipment room or a cabinet at foot of the antenna tower or on a roof.

16. The base station system according to claim 13, wherein the power supply device and the signal transmission device are mounted on the antenna tower or the pole, and the backup power supply device is installed in an equipment room or a cabinet at foot of the antenna tower or on a roof.

17. The base station system according to claim 13, wherein, among the tower-mounted devices mounted on the antenna tower or the pole, the tower-mounted devices located in a same row are aligned in the height direction of the antenna tower or the pole.

18. The base station system according to claim 13, wherein, among the tower-mounted devices mounted on the antenna tower or the pole, the tower-mounted devices located in a same row are the same or similar in height.

19. The base station system according to claim 13, wherein, among the tower-mounted devices mounted on the antenna tower or the pole, the tower-mounted devices located in a same row are the same or similar in cross-sectional shape and size.

20. The base station system according to claim 13, wherein, among the tower-mounted devices mounted on the antenna tower or the pole, the tower-mounted devices located in a same row are different in thickness.

21. The base station system according to claim 13, wherein, among the tower-mounted devices mounted on the antenna tower or the pole, there is no spacing between adjacent tower-mounted devices among the tower-mounted devices located in a same row.

22. The base station system according to claim 13, wherein, among the tower-mounted devices mounted on the antenna tower or the pole, all the tower-mounted devices located in a same row have a rectangular cross-sectional shape.

23. The base station system according to claim 13, wherein a side surface of the tower-mounted device by which the tower-mounted device is mounted on the antenna tower or the pole is a mounting side surface; a side surface, opposite to the mounting side surface, of the tower-mounted device is provided with a cable outlet; and an electrical signal transmission line of the tower-mounted device extends from the inside of the tower-mounted device to the outside of the tower-mounted device through the cable outlet.

24. The base station system according to claim 13, wherein the side surface of the tower-mounted device by which the tower-mounted device is mounted on the antenna tower or the pole is the mounting side surface; the mounting side surface is a back surface of the tower-mounted device; and the side surface, opposite to the mounting side surface, of the tower-mounted device is a front panel of the tower-mounted device.

25. The base station system according to claim 13, wherein, the tower-mounted devices located in a same row are in a box shape.

* * * * *

UNITED STATES PATENT AND TRADEMARK OFFICE
CERTIFICATE OF CORRECTION

PATENT NO. : 9,941,917 B2
APPLICATION NO. : 14/982471
DATED : April 10, 2018
INVENTOR(S) : Wang et al.

It is certified that error appears in the above-identified patent and that said Letters Patent is hereby corrected as shown below:

In the Drawings

Sheet 7 of 7, in "FIG. 9", Line 5, delete "ACDC" and insert -- AC/DC --, therefor.

Signed and Sealed this
Twenty-fifth Day of October, 2022

Katherine Kelly Vidal
*Director of the United States Patent and Trademark Office*